(12) United States Patent
Toal et al.

(10) Patent No.: US 11,734,058 B2
(45) Date of Patent: Aug. 22, 2023

(54) SYSTEMS AND METHODS OF A VIRTUALIZED MANAGEMENT OPERATION ENGINE OF A DISTRIBUTED SYSTEM

(71) Applicant: salesforce.com, inc., San Francisco, CA (US)

(72) Inventors: Brian Toal, San Francisco, CA (US); Sankar Rao Bhogi, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 360 days.

(21) Appl. No.: 17/081,048

(22) Filed: Oct. 27, 2020

(65) Prior Publication Data

US 2022/0129304 A1 Apr. 28, 2022

(51) Int. Cl.
| | | |
|---|---|---|
| *G06F 9/46* | (2006.01) | |
| *G06F 9/48* | (2006.01) | |
| *G06F 9/54* | (2006.01) | |
| *H04L 67/02* | (2022.01) | |
| *G06F 11/07* | (2006.01) | |
| *G06F 9/50* | (2006.01) | |

(52) U.S. Cl.
CPC .......... *G06F 9/4862* (2013.01); *G06F 9/5027* (2013.01); *G06F 9/542* (2013.01); *G06F 11/0772* (2013.01); *H04L 67/02* (2013.01)

(58) Field of Classification Search
CPC ...... G06F 9/4862; G06F 9/5027; G06F 9/542; G06F 11/0772; H04L 67/02
See application file for complete search history.

(56) References Cited

U.S. PATENT DOCUMENTS

| | | | | |
|---|---|---|---|---|
| 5,404,523 A | * | 4/1995 | DellaFera | G06F 9/466 |
| | | | | 719/330 |
| 6,209,018 B1 | * | 3/2001 | Ben-Shachar | G06F 9/465 |
| | | | | 718/105 |
| 6,247,056 B1 | * | 6/2001 | Chou | H04L 9/40 |
| | | | | 709/227 |
| 2013/0007239 A1 | * | 1/2013 | Agarwal | H04L 63/02 |
| | | | | 709/223 |

* cited by examiner

*Primary Examiner* — Diem K Cao
(74) *Attorney, Agent, or Firm* — Butzel Long

(57) ABSTRACT

Systems and method are provided for receiving, at a virtualized management operation engine (VMOE) of a distributed system, a management task request from a client for one or more services. The management task request may be to an orchestrator of a first application server of one or more application servers of the distributed system. The first application server having the orchestrator may determine whether the management task request is valid. The first application server having the orchestrator may generate a request message based on the valid management task request. A message bus may broadcast the generated request message to one or more agents of the one or more application servers of the distributed system. The one or more agents may execute an operation based on the request message when the request message is intended for the one or more agents.

24 Claims, 5 Drawing Sheets

SYSTEMS AND METHODS OF A VIRTUALIZED MANAGEMENT OPERATION ENGINE OF A DISTRIBUTED SYSTEM

BACKGROUND

Present application management operations typically implement a unique manager to manage their specific services, and do not rely upon a universal application management solution. Such unique managers typically lack virtualization, security, isolation between processing paths of customer requests and an application program interface (API), consistency with the programming interface between different use cases, auditing of management operations, extensibility of having a framework of how to call management operations, efficiency in usage of system resources, and automated service management.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1:
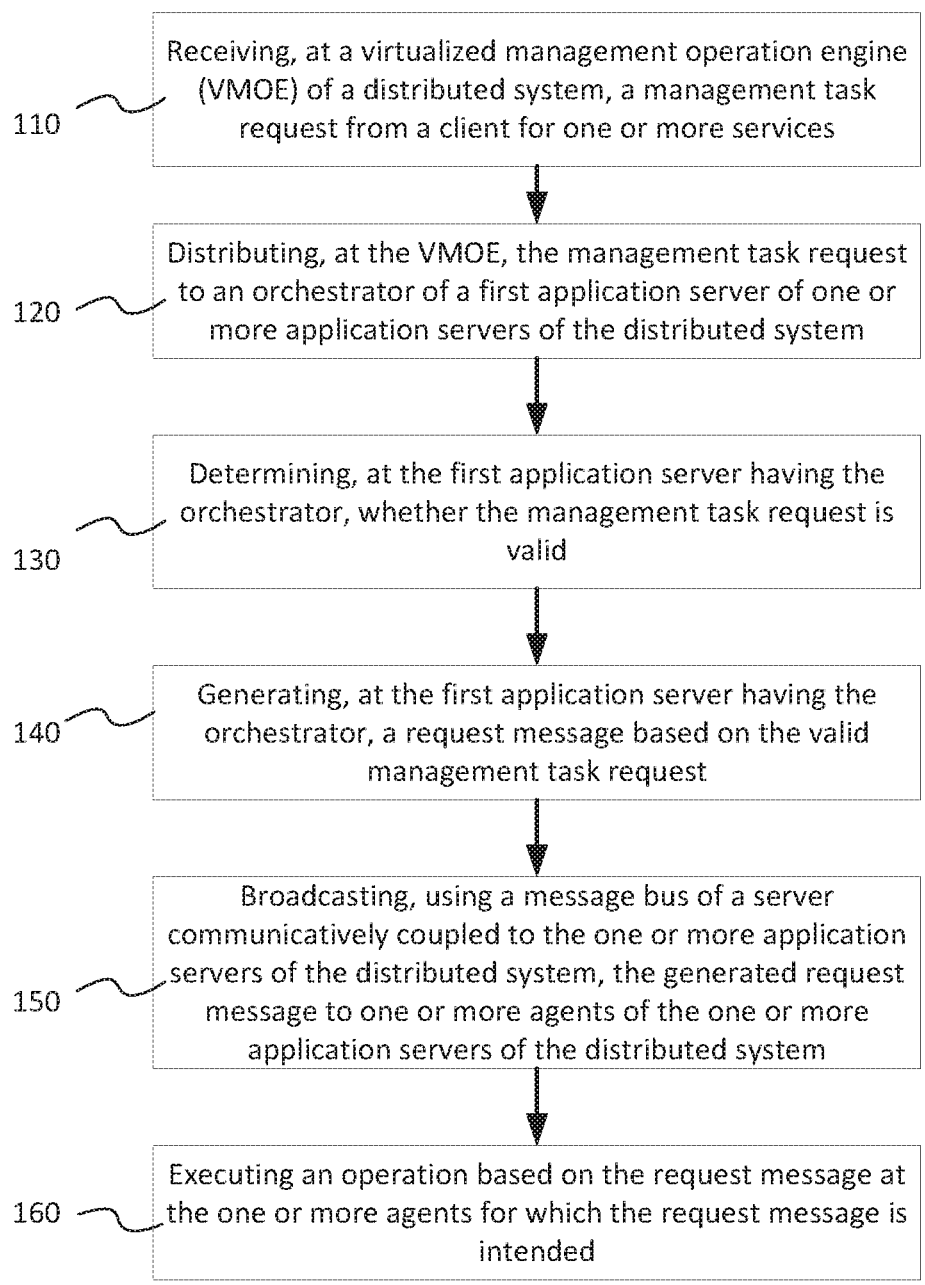
FIGS. 1-3 show an example method of using a virtualized management operation engine (VMOE) may be configured to execute operations across the distributed system according to an implementation of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide a virtualized management operation engine (VMOE) which hides the complexity of an ever-changing cluster shape of a distributed system from one or more clients which request an operation. Such changes to the distributed system may occur deterministically, such as for planned operations (e.g., application upgrade and the like). Changes to the distributed system may occur non-deterministically, due to instance failures (e.g., process crashes) and the like. That is, application servers may be added or removed from a cluster in a distributed system. With the VMOE of disclosed subject matter, the one or more client devices may refrain from tracking changes to the distributed system, and may provide an operational request to the VMOE without regard to which application servers are part of the distributed system.

A service may be provided by at least one application server having N independently running instances, where the instances may have varying life cycles. Without a mechanism to abstract cluster membership of the distributed system, clients may not have a clean, simple way to communicate with hosts providing the services (e.g., application servers). In implementations of the disclosed subject matter, the VMOE may track the target service topology of the application servers. The VMOE may be used to execute operations in a federated way across the distributed network as application servers and/or instances join and/or leave the cluster. The client requesting the service may thus issue a request without tracking the topology of the cluster.

The VMOE may support one or more semantics (e.g., fire-and-forget, multi-cast, and the like). In implementations of the disclosed subject matter, the VMOE may be configured so that operations be executed homogeneously within a single service, and/or may be configured so that operation may be executed across services provided by one or more application servers of the distributed system.

Implementations of the disclosed subject matter differ from present systems, which do not have a universal pattern or process to facilitate application management operations. Typically, each organization has their own implementation to manage services. Such present systems have problems with regard to virtualization, security, isolation, consistency, auditing, total cost of ownership, extensibility, reliability, performance, and/or automated service management. Present systems lack virtualization and/or abstraction to hide the number of instances that make up a cluster. This leads to clients of present systems to probe a current cluster shape, as well as iterate through each instance executing the management operations.

Present systems may lack a security model security in implementing management operations. That is, unauthenticated and unauthorized users may execute management operations.

Present systems may have issues related to isolation, where the application programming interface (API) of such systems is typically tightly coupled with the same processing paths of customer requests. This lack of isolation becomes problematic when a customer requests an instance that makes serving the management API difficult and/or impossible.

Present systems may lack consistency, where APIs may be different from one use case to the next. This makes training for such systems difficult, and may increase the total cost of ownership. Such consistency issues may make present systems more fragile and/or prone to failure.

Management operations of present system may not be audited, which may make it difficult to determine why the execution of management operations may fail.

In present systems, having each feature team have their own management interface becomes costly. That is, having a common abstraction, such as the VMOE disclosed herein, may reduce costs.

As present systems may lack a framework of how to call management operations, present systems may lack extensibility. Existing management APIs for present systems may not have a guaranteed reliability semantic, which may lead to inconsistent reads or executions of corresponding operations. The lack of an efficient management interface may cause present systems to inefficiently use system resources.

Present systems may lack automated service management. As such present systems lack the secure API and operation execution engine of the implementations of the disclosed subject matter, present systems typically do not have self-mediating software that can be remotely controlled, which limits the ability of such software to be scaled.

The virtualized management operation engine (VMOE) disclosed herein addresses the deficiencies of present systems, and provides virtualization, security, isolation, consistency, auditing, reduced total cost of ownership, extensibility, reliability, performance, and/or automated service management.

Implementations of the disclosed subject matter provide a single virtualized application program interface (API) that clients may use to execute operation across the cluster of application servers of a distributed system. The VMOE exposes APIs that may be called by RPC (remote procedure call) and/or in memory mechanisms. The caller (e.g., a client) may specify the operations to be called, without regard to the shape of the cluster (e.g., without tracking the application servers that have been added and/or removed from a distributed system). Implementations of the disclosed subject matter may support a plurality of semantics, which the caller may specify when executing the virtualized API.

The VMOE may communicate with each application server via a message bus. This may decouple the VMOE from the application servers, which may make the VMOE available when one of the application servers is non-responsive. The VMOE and message bus arrangement may configure the VMOE to be scalable, so as to handle services (e.g., thousands of services in a cloud network).

The operations of a distributed network may be decoupled from the VMOE. Each instance of a service, such as provided by an application server, may include a VMOE client module which subscribes to messages on the message bus. When VMOE publishes a virtual operation, each VMOE client on the one or more application servers may receive the message, and determine whether to process the received message. The message payload may include semantic, operation, and/or operation arguments that may determine how the request may be handled. The operation specified in the payload may be mapped to the operation implementation on one or more application servers. This may be done through dynamic dispatch, or the like. This decoupling may allow operations designers to provide an operation implementation into the service of an application server without communicating with VMOE about the operation. This may provide service owners the agility to add new commands in a lightweight fashion, and does not require a software release to the VMOE.

Figure 2:
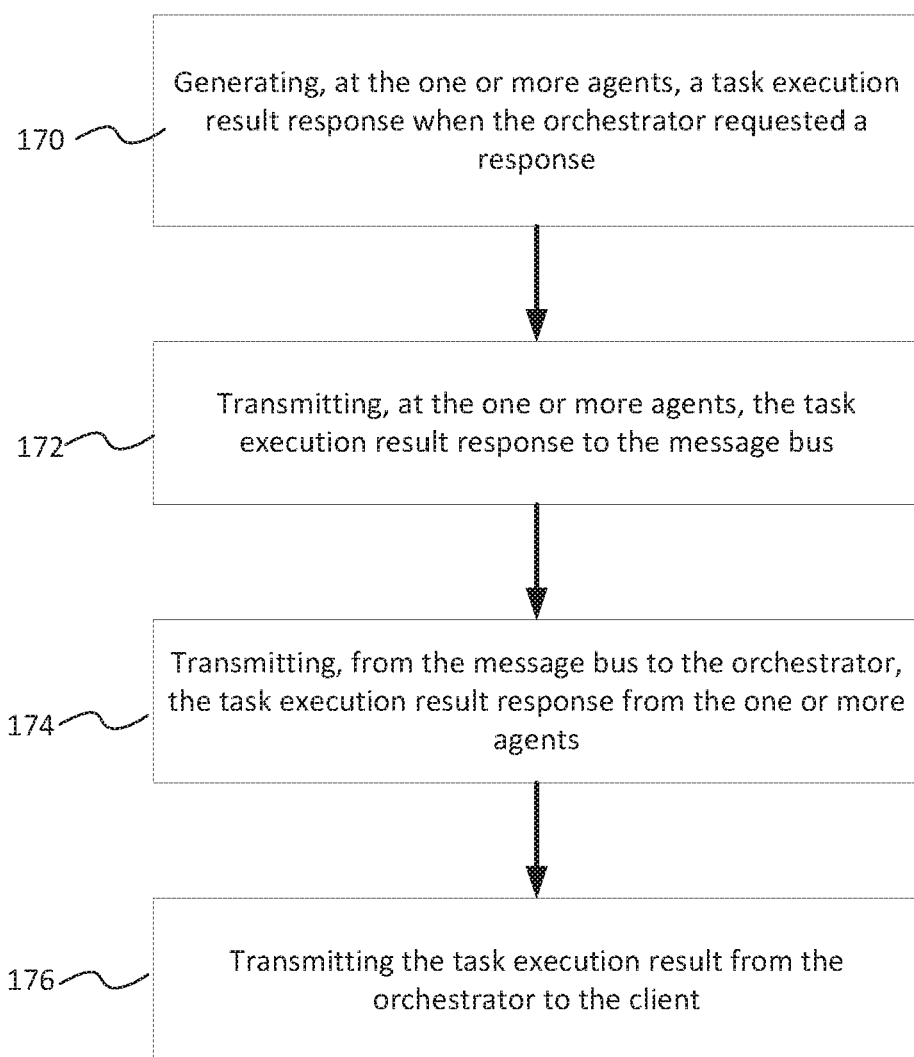
Figure 3:
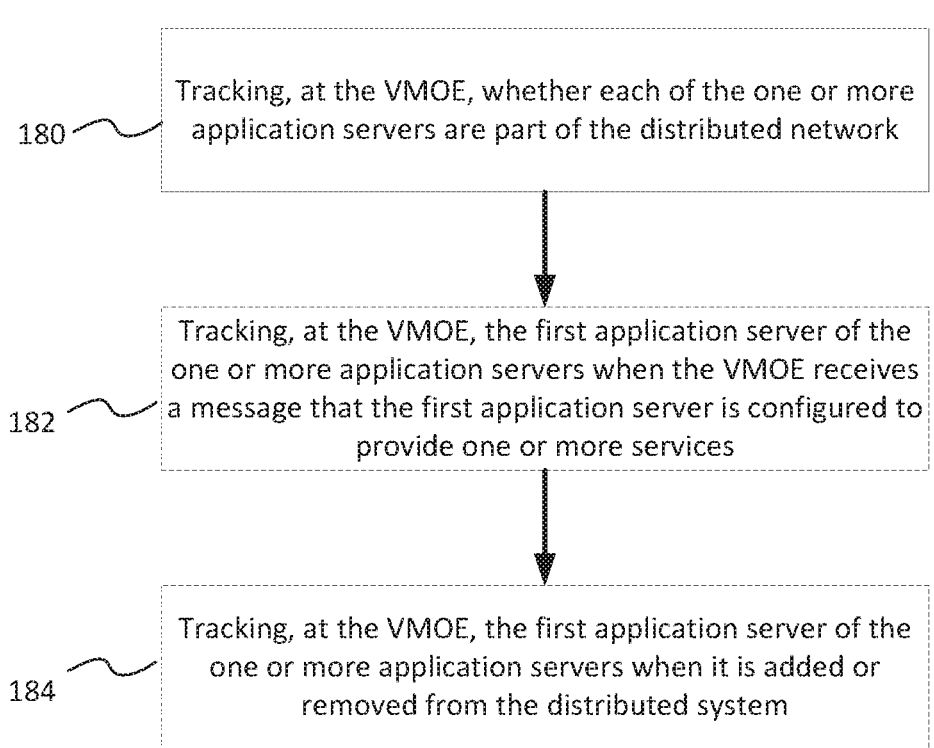

FIGS. 1-3 show an example method 100 of using a virtualized management operation engine (VMOE) may be configured to execute operations across the distributed system according to an implementation of the disclosed subject matter. At operation 110, a virtualized management operation engine (VMOE) (e.g., a virtualized management operation engine (VMOE) 204 shown in FIG. 4) of a distributed system (e.g., distributed system 200 shown in FIG. 4) may receive a management task request (e.g., from network 202 communicatively coupled to the VMOE 204 shown in FIG. 4) from a client (e.g., computer 500 shown in FIGS. 4-5) for one or more services. The operations of method 100 described below in connection with FIGS. 1-3 may relate to orchestrator 206A, application server 208A, and agent 210A shown in FIG. 4, but similar operations may be performed using application server 208B, orchestrator 206B, and agent 210B, and/or application server 208C, orchestrator 206C, and agent 210C shown in FIG. 4. The VMOE may support one or more semantics that are included in the management task request received from the client via the network 202. The semantics may include, for example, fire and forget, multi-cast, and the like. That is, the client may specify the semantics in the management task request, and the VMOE may handle different semantics provided by the client.

The management task request received by the VMOE (e.g., VMOE 204 shown in FIG. 4) from the client may be without regard to the one or more application servers (e.g., application servers 208A, 208B, 208C) of the distributed system at a time that the management task request is sent. That is, the client may not need to track which application servers are actively part of a distributed network at a given time. The VMOE may provide a single virtualized application program interface (API) that is used to execute one or more operations on the one or more application servers of the distributed system. The management task request of the client may interface with the API of the VMOE and use a specified semantic, without the client tracking the topology of the distributed computing system, where membership may change over time.

At operation 120, the VMOE may distribute the management task request to an orchestrator (e.g., orchestrator 206A shown in FIG. 4) of a first application server (e.g., application server 208A shown in FIG. 4) of one or more application servers (e.g., application server 208B, 208C, and the like) of the distributed system. Each of the application servers may correspondingly have orchestrators (e.g., orchestrators 206B, 206C of application servers 208B, 208C, respectively, shown in FIG. 4) that may be configured to receive and/or process the management task request.

At operation 130, the first application server (e.g., application server 208A) having the orchestrator (e.g., orchestrator 206A) may determine whether the management task request is valid. In some implementations, the determining whether the management task request is valid may include determining whether the management task is stored in a registry and/or other storage device of the first application server (e.g., application server 208A). If the management task request is not valid, the first application server may transmit an error message to the client (e.g., device 500) via the network (e.g., network 202). When the first application server determines the request is valid, the first application server may generate a request message (e.g., message 212 shown in FIG. 4) based on the valid management task request at operation 140. In some implementations, the generated request message may include creating a universal unique identifier (UUID) to uniquely identify the request message. The UUID may be used to track the message as it is processed by the message bus (e.g., message bus 210 shown in FIG. 4) and/or one or more agents (e.g., agents 210A, 210B, 210C shown in FIG. 4).

At operation 150, using a message bus (e.g., message bus 210 shown in FIG. 4) of a server communicatively coupled to the one or more application servers of the distributed system, the generated request message (e.g., message 212 shown in FIG. 4) may be broadcast to one or more agents (e.g., as messages 214A, 214B, 214C to respective agents 210A, 210B, 210C) of the one or more application servers (e.g., application servers 208A, 208B, 208C) of the distributed system. The one or more agents of the application servers may be used to process the request message, which may be used to execute one or more operations and/or transmit results to the client.

At operation 160, the one or more agents (e.g., agents 210A, 201B, and/or 210C) may execute an operation based on the request message (e.g., message 214A, 214B, and/or 214C) for which the request message is intended. In some implementations, the one or more agents (e.g., agent 210A, 201B, and/or 201C shown in FIG. 4) may determine whether the request message is intended for the one or more agents (e.g., agent 210A, 201B, and/or 201C shown in FIG. 4) before executing the operation. The message bus may collect response messages (e.g., message 214A, 214B, and/or 214C) from agents (e.g., agent 210A, 210B, and/or 210C) and transmit them (e.g., as message 216 shown in FIG. 4) to the orchestrator (e.g., orchestrator 206A), who may transmit them to the client (e.g., as message 218 to computer 500 view network 202).

FIG. 2 shows additional operations of method 100 according to implementations of the disclosed subject matter. At operation 170, the one or more agents (e.g., agent 210A, 210B, and/or 210C shown in FIG. 4) may generate a task execution result response when the orchestrator (e.g., orchestrator 206A shown in FIG. 4) requested a response. At operation 172, the one or more agents (e.g., agent 210A, 210B, and/or 210C) may transmit the task execution result response to the message bus (e.g., message bus 210). In some implementations, the orchestrator may not request a response and the one or more agents may execute the operation 160 as described above, but may refrain from generating and transmitting the task execution result response at operations 170 and 172.

Figure 4:
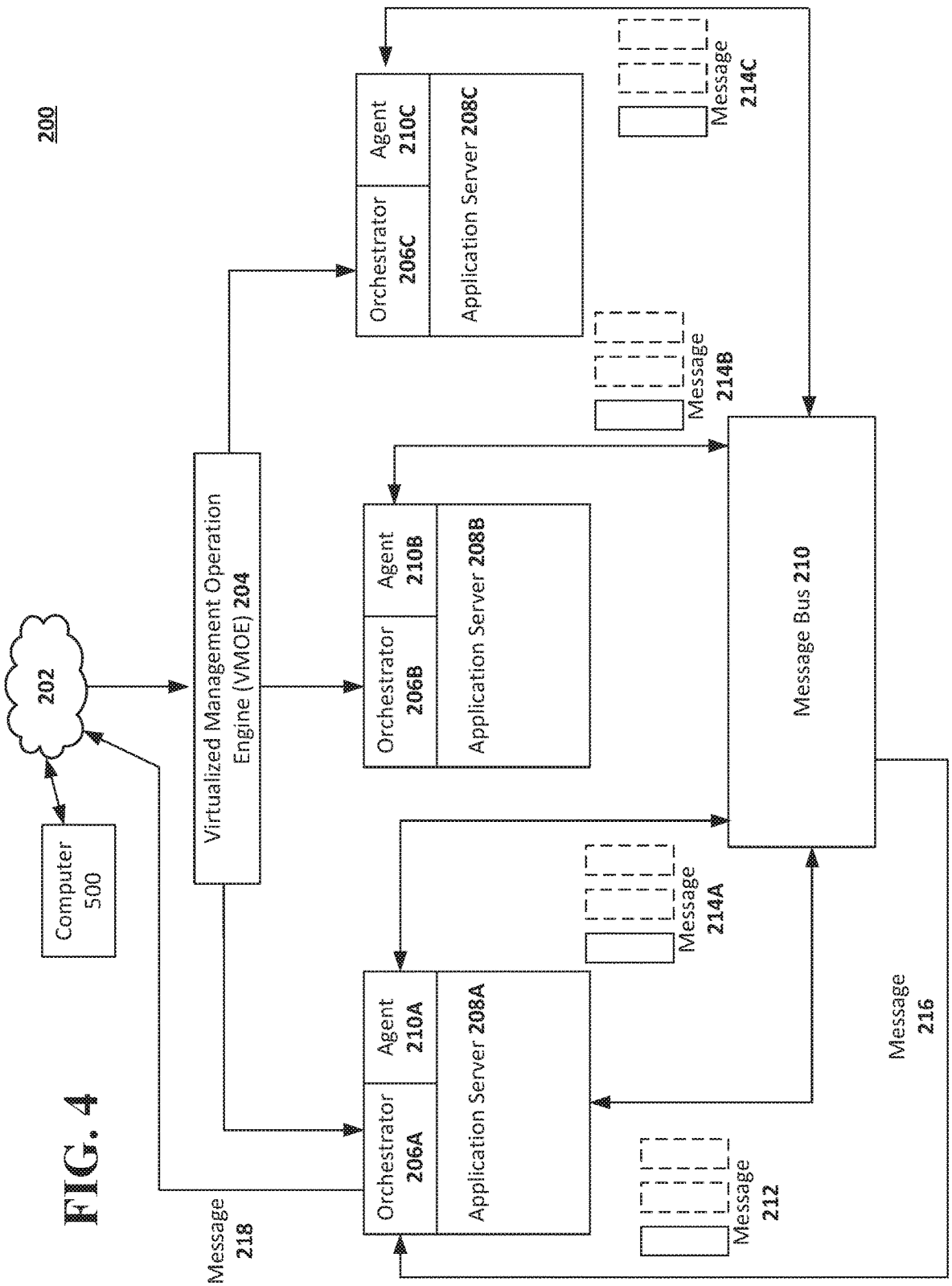
FIG. 4 shows an example of a distributed system with a VMOE and a message bus according to implementations of the disclosed subject matter.

At operation 174, the message bus (e.g., message bus 210 shown in FIG. 4) may transmit the task execution result response (e.g., as message 216) to the orchestrator (e.g., orchestrator 206A shown in FIG. 4). At operation 176, the task execution result may be transmitted from the orchestrator (e.g., orchestrator 206A) to the client (e.g., message 218 may be transmitted via network 202 to device 500). Although FIG. 4 shows the result response as message 216 being transmitted to the orchestrator 206A, and the task execution result as message 218 being transmitted from the orchestrator 206A, the result response may be transmitted to the orchestrator 206B and/or 206C, and a task execution result may be transmitted from the orchestrator 206B and/or 206C to the device 500 (e.g., the client) via network 202.

FIG. 3 shows additional operations of method 100 according to implementations of the disclosed subject matter. At operation 180, the VMOE (e.g., VMOE 204 shown in FIG. 4) may track whether each of the one or more application servers (e.g., application servers 208A, 208B, 208C) are part of the distributed network (e.g., distributed network 208C). In some implementations, the VMOE (e.g., VMOE 204) may track the first application server (e.g., application server 208A) of the one or more application servers when the VMOE receives a message that the first application server is configured to provide one or more services. In some implementations, the VMOE may track the first application server of the one or more application servers when it is added or removed from the distributed system (e.g., distributed system 200).

FIG. 4 shows an example of a distributed system 200 that includes a VMOE 204 and a message bus 210 according to implementations of the disclosed subject matter. Network 202 may be any suitable wired and/or wireless communications network that may connect a computer 500 (e.g., a client device) with the VMOE 204. Computer 500 is shown is detail in FIG. 5 and described below. The VMOE 204 may be one or more hardware servers, cloud servers, or the like. The VMOE 204 may be provided by a server that is communicatively coupled to the application servers 208A, 208B, 208C. The application server 208A, 208B, 208C may be implemented on one or more hardware servers, cloud server systems, databases, clusters, neural network systems, or the like.

The application server 208A, 208B, 208C may include a storage device, which may use any suitable combination of any suitable volatile and non-volatile physical storage mediums, including, for example, hard disk drives, solid state drives, optical media, flash memory, tape drives, registers, and random access memory, or the like, or any combination thereof. In some implementations, one or more of the application servers 208A, 208B, 208C may be communicatively coupled to a database system. The database system may be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

Message bus 210 may be implemented on a separate hardware server or cloud server system than the VMOE 204 and/or the application servers 208A, 208B, 208C.

Figure 5:
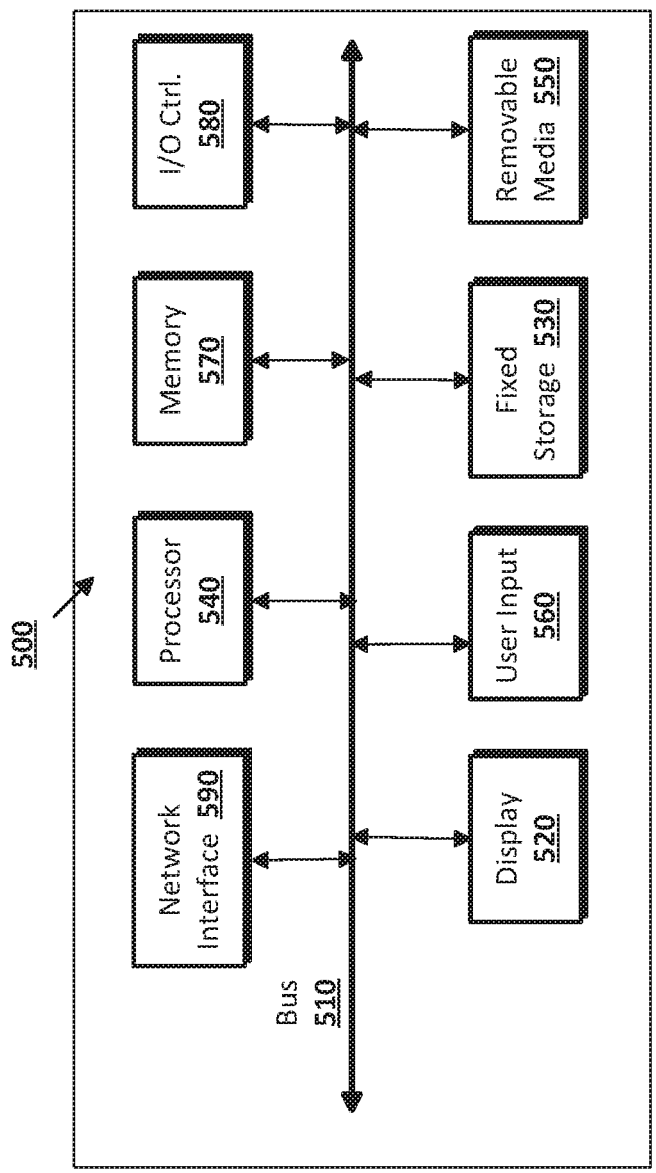
FIG. 5 shows a portion of the distributed system of FIG. 4 that implements the VMOE and message bus according to an implementation of the disclosed subject matter.

Implementations of the presently disclosed subject matter may be implemented in and used with a variety of component and network architectures. FIG. 5 is an example computer 500 suitable for implementing implementations of the presently disclosed subject matter. In some implementations, the computer 500 may be a client device used to generate and/or transmit a management task request via network 202 to the VMOE 204 shown in FIG. 4.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, such as network 202 shown in FIG. 4.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIGS. 4-5 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "distributing," "determining," "generating," "broadcasting," "executing" "transmitting," "tracking," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
  receiving, at a virtualized management operation engine (VMOE) of a distributed system, a management task request from a client for one or more services without specifying one or more application servers of the distributed system in the management task request;
  selecting, at the VMOE, a first application server of the one or more application servers of the distributed system to process the management task request;
  transmitting, at the VMOE, the management task request to an orchestrator of the first application server that is selected by the VMOE;
  determining, at the first application server having the orchestrator, whether the management task request is valid;
  generating, at the first application server having the orchestrator, a request message based on the valid management task request;
  broadcasting, using a message bus of a server communicatively coupled to the one or more application servers of the distributed system, the generated request message to one or more agents of the one or more application servers of the distributed system; and executing an operation based on the request message at the one or more agents for which the request message is intended.

2. The method of claim 1, further comprising:
generating, at the one or more agents, a task execution result response when the orchestrator requested a response; and
transmitting, at the one or more agents, the task execution result response to the message bus.

3. The method of claim 2, further comprising:
transmitting, from the message bus to the orchestrator, the task execution result response from the one or more agents.

4. The method of claim 3, further comprising:
transmitting the task execution result from the orchestrator to the client.

5. The method of claim 1, wherein the determining whether the management task request is valid comprises:
determining whether the management task is stored in a registry of the first application server.

6. The method of claim 1, further comprising:
generating, at the first application server, the request message by creating a universal unique identifier (UUID) to uniquely identify the request message.

7. The method of claim 1, wherein the determining whether the management task request is valid further comprises:
transmitting an error message to the client when the management task request is determined to be invalid.

8. The method of claim 1, further comprising:
tracking, at the VMOE, whether each of the one or more application servers are part of the distributed network.

9. The method of claim 8, wherein the tracking comprising:
tracking, at the VMOE, the first application server of the one or more application servers when the VMOE receives a message that the first application server is configured to provide one or more services.

10. The method of claim 8, wherein the tracking comprises:
tracking, at the VMOE, the first application server of the one or more application servers when it is added or removed from the distributed system.

11. The method of claim 1, wherein the VMOE supports one or more semantics that are included in the management task request received from the client.

12. The method of claim 1, wherein the VMOE provides a single virtualized application program interface (API) that is used to execute one or more operations on the one or more application servers of the distributed system.

13. A system comprising:
a distributed system having one or more application servers, including a first application server;
a virtualized management operation engine (VMOE) of a first server to receive a management task request from a client device for one or more services without specifying the one or more application servers of the distributed system in the management task request, to select a first application server of the one or more application servers of the distributed system to process the management task request, and to transmit the management task request to an orchestrator of the first application server of the one or more application servers that is selected by the VMOE;
the first application server to determine whether the management task request is valid, and to generate a request message based on the valid management task request; and
a message bus of a second server communicatively coupled to the one or more application servers of the distributed system to broadcast the generated request message to one or more agents of the one or more application servers of the distributed system,
wherein the one or more agents of the one or more application servers executes an operation based on the request message for which the request message is intended.

14. The system of claim 13, wherein the one or more agents of the one or more application servers generates a task execution result response when the orchestrator requested a response, and transmits the task execution result response to the message bus of the second server.

15. The system of claim 14, wherein the message bus transmits the task execution result response from the one or more agents to the orchestrator.

16. The system of claim 15, wherein the orchestrator transmits the task execution result to a client device.

17. The system of claim 13, wherein the first application server determines whether the management task request is valid by determining whether the management task is stored in a registry of the first application server.

18. The system of claim 13, wherein the first application server generates the request message by creating a universal unique identifier (UUID) to uniquely identify the request message.

19. The system of claim 13, wherein the first application server determines whether the management task request is valid by transmitting an error message to the client when the management task request is determined to be invalid.

20. The system of claim 13, wherein the VMOE of the first server tracks whether each of the one or more application servers are part of the distributed network.

21. The system of claim 20, wherein the VMOE of the first server tracks the first application server of the one or more application servers when the VMOE receives a message that the first application server is configured to provide one or more services.

22. The method of claim 20, wherein the VMOE of the first server tracks the first application server of the one or more application servers when it is added or removed from the distributed system.

23. The system of claim 13, wherein the VMOE supports one or more semantics that are included in the management task request received from the client device.

24. The system of claim 13, wherein the VMOE of the first server provides a single virtualized application program interface (API) that is used to execute one or more operations on the one or more application servers of the distributed system.

* * * * *